(12) United States Patent
Al-Dossary et al.

(10) Patent No.: US 10,783,693 B2
(45) Date of Patent: Sep. 22, 2020

(54) SEISMIC IMAGE ORIENTATION USING 3D INTEGRATION OPERATIONS

(71) Applicant: Saudi Arabian Oil Company, Dhahran (SA)

(72) Inventors: Saleh Al-Dossary, Dammam (SA); Jinsong Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 408 days.

(21) Appl. No.: 15/584,907

(22) Filed: May 2, 2017

(65) Prior Publication Data
US 2018/0321403 A1  Nov. 8, 2018

(51) Int. Cl.
*G06T 15/00* (2011.01)
*G01V 1/36* (2006.01)
*G01V 1/30* (2006.01)
*G06T 17/05* (2011.01)

(52) U.S. Cl.
CPC .............. *G06T 15/00* (2013.01); *G01V 1/364* (2013.01); *G01V 1/307* (2013.01); *G01V 2210/3248* (2013.01); *G01V 2210/63* (2013.01); *G01V 2210/64* (2013.01); *G01V 2210/74* (2013.01); *G06T 17/05* (2013.01)

(58) Field of Classification Search
CPC ............. G01V 1/364; G01V 1/307; G01V 2210/3248; G01V 2210/63; G01V 2210/64; G01V 2210/74; G06T 15/00; G06T 17/05
See application file for complete search history.

(56) References Cited

U.S. PATENT DOCUMENTS

| | | | |
|---|---|---|---|
| 2005/0049791 A1* | 3/2005 | Bespalov | G01V 3/28 702/7 |
| 2010/0027848 A1 | 2/2010 | Al-Dossary et al. | |
| 2016/0011324 A1* | 1/2016 | Hamon | G01V 1/003 367/14 |
| 2019/0011582 A1* | 1/2019 | Aarre | G01V 1/302 |

FOREIGN PATENT DOCUMENTS

WO    2017062390    4/2017

OTHER PUBLICATIONS

Hafiz et al., "A New Approach for 3D Range Image Segmentation using Gradient Method", J Computer Sci 7(4) 2001, pp. 475-487.*
Adetokunbo et al., "3D seismic edge detection using magic squares and cubes," XP055490968, Interpretation, vol. 4, No. 3, Aug. 1, 2016, 10 pages.

(Continued)

*Primary Examiner* — Catherine T. Rastovski
(74) *Attorney, Agent, or Firm* — Fish & Richardson P.C.

(57) ABSTRACT

A separate three-dimensional (3D) integration filter mask if precomputed for each of x, y, and z dimensions with a given operator length. A portion of a 3D post-stack seismic data set is received for processing and loaded into a generated 3D-sub-cube. The separate 3D integration filter masks are applied to the loaded 3D-sub-cube to generate filtered 3D-sub-cube data. The square mean of the 3D-sub-cube is calculated to generate smoothed 3D-sub-cube data.

20 Claims, 13 Drawing Sheets

(56) References Cited

OTHER PUBLICATIONS

Al-Dossary et al., "SPE-183677-MS Enhanced Reservoir Characterization using High-Resolution Seismic Attributes," XP055490929, presented at the SPE Middle East Oil & Gas Show and Conference, May 6-9, 2017, 6 pages.
Wu, "Directional structure-tensor-based coherence to detect seismic faults and channels," Geophysics vol. 82, No. 2, Mar. 1, 2017, 5 pages.
International Search Report and Written Opinion issued in International Application No. PCT/US2018/028862 dated Jul. 23, 2018, 15 pages.
Xudong Jiang, "Extracting Image Orientation Feature by Using Integration Operator", The Journal of Pattern Recognition Society, 40 (2007) 705-717, Apr. 2006.
Mohammed Alfaraj et al., "Enhanced isotropic Gradient Operator", Geophysical Prospecting, EAGE—European Association of Geoscientists & Engineers, doi:10.111/1365-2478.12106; 2014 Saudi Aramco, 11 pages.
Satinder Chopra et al.; "Seismic Discontinuity Attributes and Sobel Filtering", DOI http://dx.doi.org/10.1190/segam2014-0465.1, SEG Denver 2014 Annual Meeting, 2014 SEG, 5 pages.
Gulf Cooperation Council Examination Report issued in GCC Application No. 2018-35218 dated Nov. 14, 2019, 4 pages.
Gulf Cooperation Council Examination Report issued in GCC Application No. 2018-35218 dated Mar. 18, 2020, 4 pages.

\* cited by examiner

300

M=2, 3x3x3 FILTERS IN THREE DIFFERENT DIRECTIONS

| FILTER ALONG x DIRECTION: $g_x(x,y,z)$, SLICE 1 | | | FILTER ALONG y DIRECTION: $g_y(x,y,z)$, SLICE 1 | | | FILTER ALONG z DIRECTION: $g_z(x,y,z)$, SLICE 1 | | |
|---|---|---|---|---|---|---|---|---|
| 0.1111 | 0.4444 | 0.1111 | 0.1111 | 0 | 0.1111 | 0.1111 | 0.4444 | 0.1111 |
| 0 | 0 | 0 | 0.4444 | 0 | 0.4444 | 0.4444 | 1.7778 | 0.4444 |
| 0.1111 | 0.4444 | 0.1111 | 0.1111 | 0 | 0.1111 | 0.1111 | 0.4444 | 0.1111 |

| FILTER ALONG x DIRECTION: $g_x(x,y,z)$, SLICE 2 | | | FILTER ALONG y DIRECTION: $g_y(x,y,z)$, SLICE 2 | | | FILTER ALONG z DIRECTION: $g_z(x,y,z)$, SLICE 2 | | |
|---|---|---|---|---|---|---|---|---|
| -0.4444 | -1.7778 | -0.4444 | -0.4444 | 0 | -0.4444 | 0 | 0 | 0 |
| 0 | 0 | 0 | 1.7778 | 0 | 1.7778 | 0 | 0 | 0 |
| 0.4444 | 1.7778 | 0.4444 | 0.4444 | 0 | 0.4444 | 0 | 0 | 0 |

| FILTER ALONG x DIRECTION: $g_x(x,y,z)$, SLICE 3 | | | FILTER ALONG y DIRECTION: $g_y(x,y,z)$, SLICE 3 | | | FILTER ALONG z DIRECTION: $g_z(x,y,z)$, SLICE 3 | | |
|---|---|---|---|---|---|---|---|---|
| -0.1111 | -0.4444 | -0.1111 | -0.1111 | 0 | -0.1111 | -0.1111 | -0.4444 | -0.1111 |
| 0 | 0 | 0 | 0.4444 | 0 | 0.4444 | 0.4444 | 1.7778 | 0.4444 |
| 0.1111 | 0.4444 | 0.1111 | 0.1111 | 0 | 0.1111 | 0.1111 | 0.4444 | 0.1111 |

FIG. 3

| 0.0042 | .1427 | .4785 | .1427 | 0.0042 | .1427 | .2027 | 0 | .1427 | .2027 | 0.0042 | .1427 | 0.0042 |
|---|---|---|---|---|---|---|---|---|---|---|---|---|
| .4425 | 2.0227 | .7585 | .0227 | .4425 | .0225 | .4425 | 0 | 0.0042 | .4425 | .0001 | 0.0042 | .0001 |
| FILTER ALONG x DIRECTION: $g_x(x,y,z)$, SLICE 3 ||||||||||||| 
| .1659 | 0.7585 | 0.2844 | 0.7585 | 0.1659 | .0141 | 0.1659 | 0 | .0141 | 0.1659 | FILTER ALONG z DIRECTION: $g_z(x,y,z)$, SLICE 3 |||
| .0141 | 0.4785 | 1.6044 | 0.4785 | .0141 | 0.4785 | .0141 | 0 | 0.4785 | .0141 | 0 | 0 | 0 |
| 0 | 0 | 0 | 0 | 0 | .6044 | 0 | 0 | .6044 | 0 | 0 | 0 | 0 |
| 0.0141 | .4785 | .6044 | .4785 | 0.0141 | .4785 | 0.0141 | 0 | .4785 | 0.0141 | 0 | 0 | 0 |
| .1659 | .7585 | .2844 | .7585 | .1659 | 0.0141 | .1659 | 0 | 0.0141 | .1659 | 0 | 0 | 0 |
| FILTER ALONG x DIRECTION: $g_x(x,y,z)$, SLICE 4 ||||||||||||| FILTER ALONG z DIRECTION: $g_z(x,y,z)$, SLICE 4 |||
| .4425 | 2.0227 | 0.7585 | 2.0227 | .4425 | .0042 | .4425 | 0 | .0042 | .4425 | 0.0001 | .0042 | 0.0001 |

FILTER ALONG y DIRECTION: $g_y(x,y,z)$, SLICE 3

FILTER ALONG y DIRECTION: $g_y(x,y,z)$, SLICE 4

TABLE 400 (CONTINUED)

TABLE 400 (CONTINUED)

| | | | | | | | | | | | | |
|---|---|---|---|---|---|---|---|---|---|---|---|---|
| .0042 | 0.1427 | 0.4785 | 0.1427 | .0042 | 2.0227 | 0.1427 | 0 | 0.1427 | 2.0227 | .0042 | 0.1427 | 0.4785 | 0.1427 | .0042 |
| 0 | 0 | 0 | 0 | 0 | .7585 | .4785 | 0 | .4785 | .7585 | 0.0141 | .4785 | .6044 | .4785 | 0.0141 |
| 0.0042 | .1427 | .4785 | .1427 | 0.0042 | .2027 | .1427 | 0 | .1427 | .2027 | 0.0042 | .1427 | .4785 | .1427 | 0.0042 |
| .4425 | 2.0227 | .7585 | .0227 | .4425 | .4425 | 0.0042 | 0 | 0.0042 | .4425 | 0.0001 | 0.0042 | 0.0141 | 0.0042 | 0.0001 |
| FILTER ALONG x DIRECTION: $g_x(x,y,z)$, SLICE 5 | | | | | FILTER ALONG y DIRECTION: $g_y(x,y,z)$, SLICE 5 | | | | | FILTER ALONG z DIRECTION: $g_z(x,y,z)$, SLICE 5 | | | | |
| 0.0968 | 0.4425 | 0.1659 | 0.0425 | 0.0968 | 0.0968 | 0.0042 | 0 | 0.0042 | 0.0968 | 0.0968 | 0.4425 | 0.1659 | 0.4425 | 0.0968 |
| 0.0001 | 0.0042 | 0.0141 | 0.0042 | 0.0001 | 0.4425 | 0.0042 | 0 | 0.0042 | 0.4425 | 0.4425 | 2.0227 | 0.7585 | 2.0227 | 0.4425 |
| 0 | 0 | 0 | 0 | 0 | .1659 | 0 | 0 | 0 | .1659 | .1659 | .7585 | .2844 | .7585 | .1659 |
| 0.0001 | 0.0042 | 0.0042 | 0 | 0.0001 | .4425 | 0.0042 | 0 | 0.0042 | .4425 | .4425 | .0227 | .7585 | .0227 | .4425 |
| 0.0968 | .4425 | .1659 | .4425 | 0.0968 | 0.0968 | 0.0042 | 0 | 0.0042 | 0.0968 | 0.0968 | .4425 | .1659 | .4425 | 0.0968 |

400 ↗

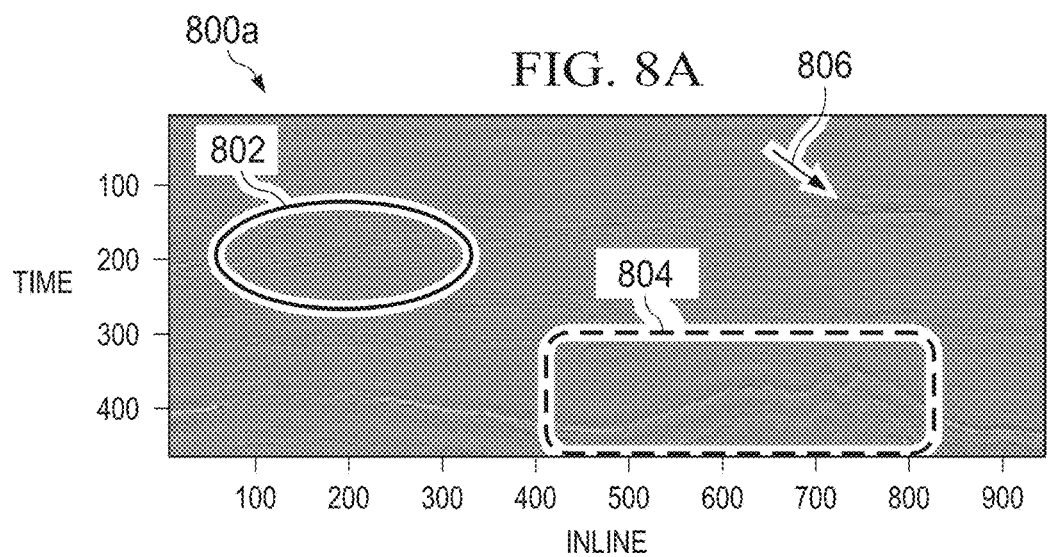
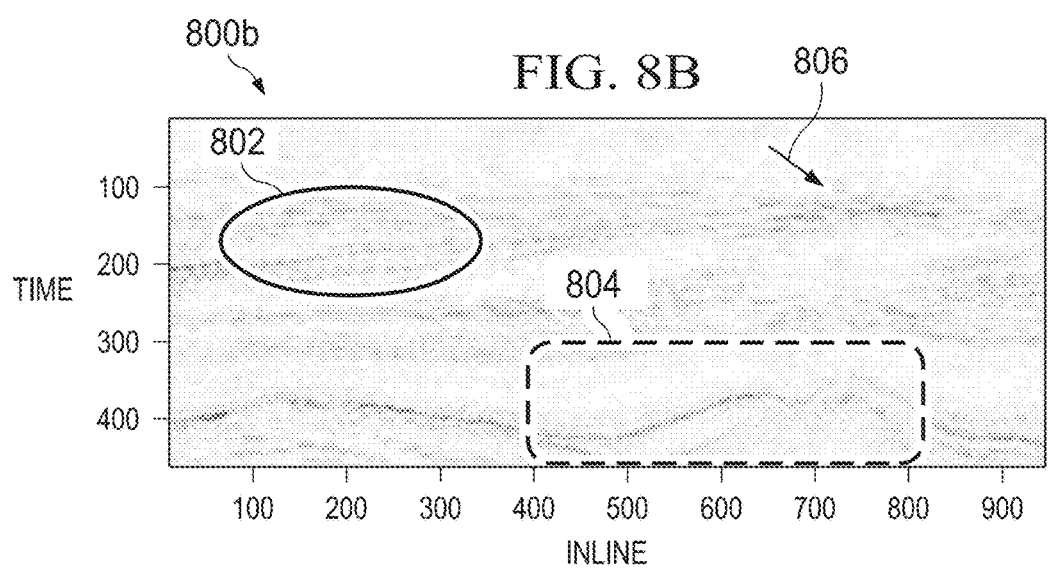
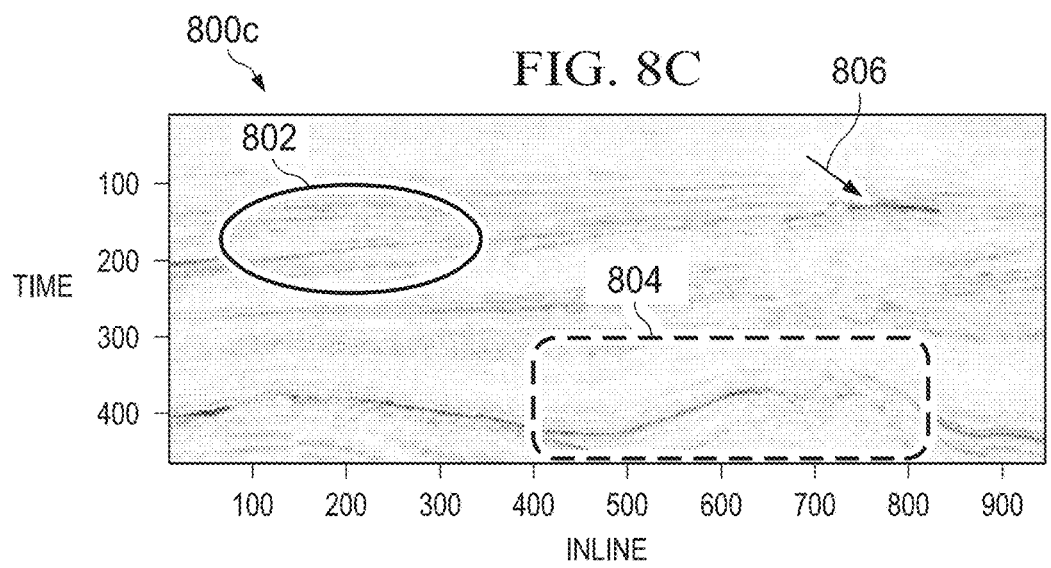

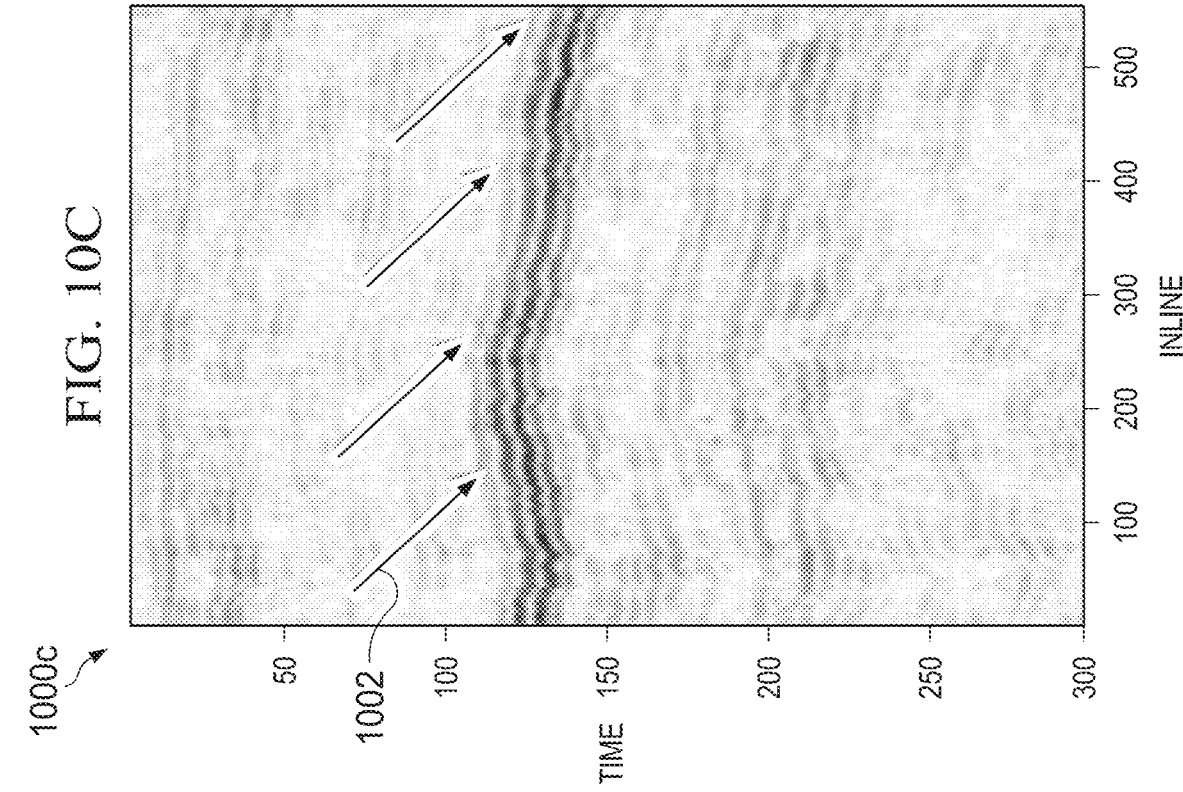
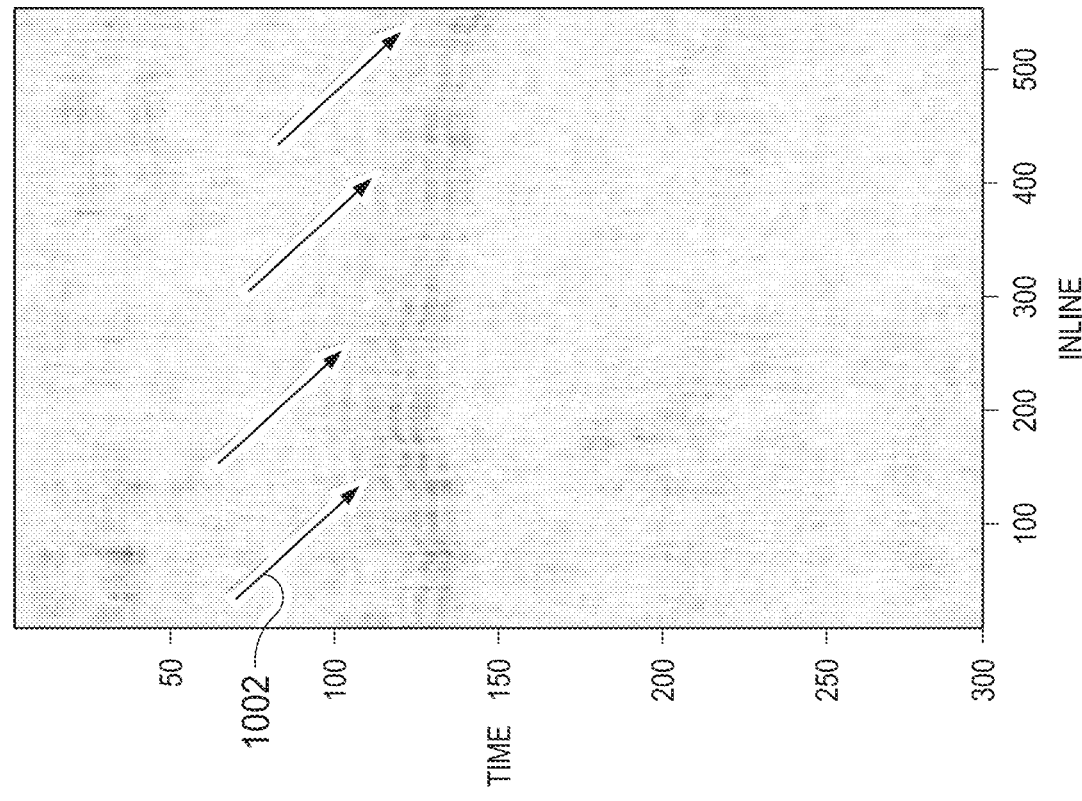

SEISMIC IMAGE ORIENTATION USING 3D INTEGRATION OPERATIONS

BACKGROUND

Mapping geologic edges (or lines) and abrupt changes, for example those associated with objects such as faults, channel levees, and fractures in seismic images, forms a critical component in the interpretation of 3D seismic volumes in drilling for sub-surface hydrocarbons. Orientation analysis, determining a direction of a highest intensity change, is widely employed in the edge/line detection, which is an important step in detection and recognition of an object. Gradient operators have traditionally been used by geoscientists to determine orientation patterns, but a 3D gradient orientation estimator is very sensitive to noise and not flexible with operator length. While a two-dimensional (2D) integration has been shown to provide a more accurate local orientation estimation with a discrete operator with flexibility in scale selection and reducing bias and mitigating noise amplification problems compared to previous gradient orientation estimators, a 2D integration does not capture dipping and azimuth information and volume change in 3D along a planar-direction necessary to compute an orientation and display data for edges, faults, and channels of 3D post stack seismic images.

SUMMARY

The present disclosure describes methods and systems, including computer-implemented methods, computer program products, and computer systems for processing and display of three-dimensional (3D) post-stack seismic data.

In an implementation, a separate three-dimensional (3D) integration filter mask if precomputed for each of x, y, and z dimensions with a given operator length. A portion of a 3D post-stack seismic data set is received for processing and loaded into a generated 3D-sub-cube. The separate 3D integration filter masks are applied to the loaded 3D-sub-cube to generate filtered 3D-sub-cube data. The square mean of the 3D-sub-cube is calculated to generate smoothed 3D-sub-cube data.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations so as to realize one or more of the following advantages. First, conventional seismic processing and imaging techniques do not typically provide adequate horizontal or vertical resolution to identify subtle geologic features that may control fluid and gas migration in hydrocarbon reservoirs. Described is a new, data-driven, 3D integration operator (or filter) that improves horizontal and vertical seismic resolution to reveal small faults, fractures, and channels. Second, the 3D integration filter inherits the major benefits of known two-dimensional (2D) integration operators (or filters) to overcome gradient operator weaknesses. Third, benefits of the 3D integration filter include, among other things consistent with this disclosure: less orientation bias; more effective noise removal; flexible operator length; and capture of dipping, azimuth, and volume change information to enhance 3D seismic images. Fourth, the 3D orientation estimation will both enhance resolution and reveal more lateral and vertical details for geo-bodies that extend into 3D space. Fifth, improvement of edge and channel image quality of seismic attributes permit building enhanced geological models of the earth's sub-surface to represent delicate geological structures. Sixth, calculated solutions can be used for detailed seismic analysis, seismic imaging and anisotropy studies, reservoir characterization, and interpretation. Seventh, the enhanced 3D seismic images provide improved hydrocarbon reservoir delineation, optimized strategies for development drilling and injection, and increased efficiency and success in drilling/injection activities. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3 illustrates a table 300 showing results of the use of a 3D filter mask coefficient of 3, according to an implementation.

FIGS. 4A-4C illustrate a table showing results of the use of a 3D filter mask coefficient of 5, according to an implementation.

FIGS. 8A-8C illustrate data plots demonstrating advantages of the described 3D integration filter (orientation) versus a 3D Sobel filter, according to an implementation.

FIGS. 10A-10C illustrate data plots demonstrating advantages of the described 3D integration filter (orientation) in relation to a 2D integration filter (orientation), according to an implementation.

Like reference numbers and designations in the various drawings indicate like elements.

DETAILED DESCRIPTION

Figure 1:
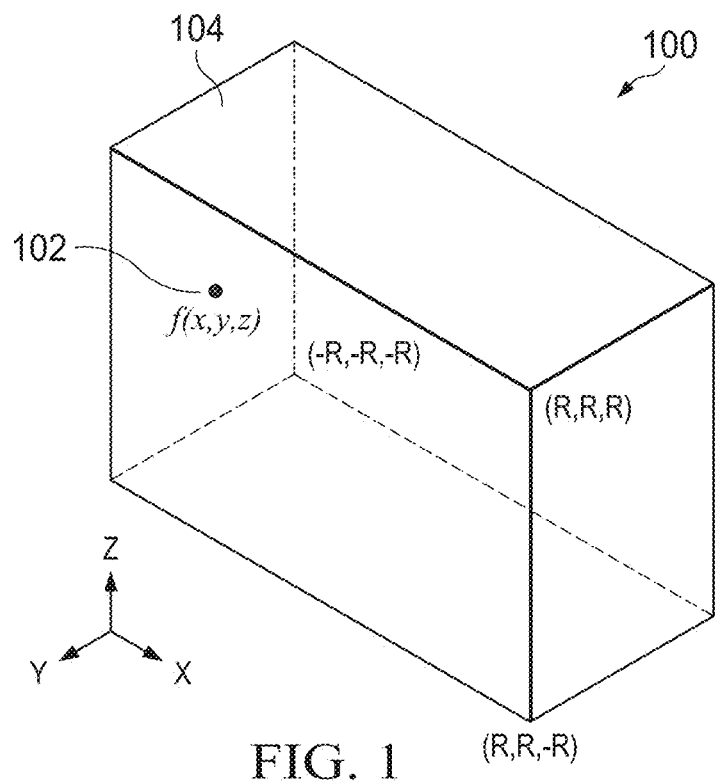
FIG. 1 is a block diagram illustrating volumetric seismic data in three-dimensional (3D) space, according to an implementation.

The following detailed description describes processing and display of three-dimensional (3D) post-stack seismic data, and more particularly enhancement of abrupt rock property change edges in the 3D post-stack seismic data by determining orientations of the edges using a 3D integration filter, and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

Geophysicists usually use seismic reflection techniques to evaluate and interpret the structure of sub-surface geologic formations to find most likely locations of hydrocarbon deposits beneath the earth's surface. Traditionally, sub-surface formations are analyzed using seismic refection data that images acoustic boundaries in the sub-surface. The reflected seismic wave energy is recorded at a number of shot points, resulting in similar artifacts on a number of adjacent seismic traces (pre-stack seismic data). 3D post-stack seismic data is obtained from processing the pre-stack data (using, for example, surface statics correction, noise reduction, normal move out, velocity analysis, deconvolution and stacking or migration, etc.). The 3D post-stack seismic data typically ranges from a surface plane of the earth to deep in the ground. The post-stack seismic energy projected directly into the earth reflects in particular ways from sub-surface changes in the rock properties. While horizon layers and gradual changes are typically reflected in the 3D post-stack volume, abrupt rock property changes, for example those associated with objects such as faults, channel levees, and fractures in seismic images, are usually not directly visible.

Mapping geologic edges (or lines) and abrupt rock property changes forms a critical component in the interpretation of a given seismic three dimensional sub-surface volume in drilling for sub-surface hydrocarbons. Orientation analysis, determining a direction of a highest intensity change, is widely employed in the edge/line detection, which is an important step in detection and recognition of an object. Gradient operators have traditionally been used by geoscientists to determine orientation patterns, but a 3D gradient orientation estimator is very sensitive to noise and not flexible with operator length. While a two-dimensional (2D) integration has been shown to provide a more accurate local orientation estimation with a discrete operator with flexibility in scale selection and reducing bias and mitigating noise amplification problems compared to previous gradient orientation estimators, a 2D integration does not capture dipping and azimuth information and volume change in 3D along a planar-direction necessary to compute an orientation and display data for edges, faults, and channels of 3D post-stack seismic images.

A proposed novel 3D integration operator (or filter) is described that inherits major benefits of 2D integration operators (or filters) to overcome gradient operator weakness and increases accuracy of estimated orientations compared to both a 2D integration filter and a 3D gradient operator. A description is presented of extending a 2D integration formula into three dimensions using a 2D Lagrange Interpolation with a double integration operation. The resultant discrete 3D integration filter is applied to 3D post-stack seismic images to enhance visibility of 3D post stack seismic amplitude to better represent faults, channels and other geophysical features. Described example case studies using the 3D integration filter through three different directions demonstrates generation of superior results in enhancing seismic amplitude and edge detection in 3D post-stack seismic images compared to the previously described traditional means using a gradient filter or a 2D integration filter.

3D Orientation Estimation Using Integration

The extension of a 2D integration filter into three dimensions hinges on the two dimensional Lagrange Interpolation of surface data and double integration operation. Volumetric data can be viewed as a scalar field represented as $f(x,y,z)$ in 3D space (as represented in FIG. 1).

FIG. 1 is a block diagram 100 illustrating volumetric seismic data in 3D space, according to an implementation. The volumetric seismic data 102 can be viewed as a scalar field represented as $f(x,y,z)$ in the cubic 3D space 104.

For a 3D continuous function, $f(x,y,z)$, a 3D operator of volume difference can be derived. A small window around an origin is used to calculate a change of a scalar filed along the x, y, and z directions. Let the radius of the small window be $\Delta$, and $\Delta \leq R$. The size of the window is then $(2\Delta+1) \times (2\Delta+1) \times (2\Delta+1)$.

For the continuous 3D function $f(x,y,z)$, a 3D operator of a volume difference can be defined as:

$$\Gamma_R f(x,y,z) = \Sigma_{\Delta=1}^{R} \omega_\Delta I_\Delta f(x,y,z) \qquad (1).$$

In typical implementations, weight $\omega_\Delta$ is simplified in Equation (1) by assigning equal weight 1 for all case studies. If the weighting vector is w, then each column of y should be multiplied by w component-wise. In the described implementation, Gaussian weight is typically recommended. When choosing standard deviation, an effective size of the operator is typically limited to be within 6σ. So, for a standard deviation of σ=1, the effective size is roughly 6×6×6. Larger or smaller size operators may not be generate desired results. For nosier data, larger operator sizes are used.

The change of the scalar filed $f(x,y,z)$ along the x direction can be calculated with the following operator:

$$D_x \triangleq \int_{y-\Delta}^{y+\Delta} \int_{z-\Delta}^{z+\Delta} f(x+\Delta,\beta,\gamma)d\beta d\gamma - \int_{y-\Delta}^{y+\Delta} \int_{z-\Delta}^{z+\Delta} f(x-\Delta,\beta,\gamma)d\beta d\gamma.$$

Similarly, a change of the scalar filed $f(x,y,z)$ along the y direction and z directions can be obtained by use of the following operators:

$$D_y \triangleq \int_{x-\Delta}^{x+\Delta} \int_{z-\Delta}^{z+\Delta} f(\alpha,y+\Delta,\gamma)d\alpha d\gamma - \int_{x-\Delta}^{x+\Delta} \int_{z-\Delta}^{z+\Delta} f(\alpha,y-\Delta,\gamma)d\alpha d\gamma, \text{ and}$$

$$D_z \triangleq \int_{x-\Delta}^{x+\Delta} \int_{y-\Delta}^{y+\Delta} f(\alpha,\beta,z+\Delta)d\alpha d\beta - \int_{x-\Delta}^{x+\Delta} \int_{y-\Delta}^{y+\Delta} f(\alpha,\beta,z-\Delta)d\alpha d\beta.$$

In practice, these three operators can be compactly written as:

$$I_\Delta f(x,y) = D_x + jD_y + kD_z.$$

Note that j and k serve as place holders, similar to the unit i in complex number. This operator uses a fixed neighborhood of size $\Delta$, reflecting an implicit assumption of the underlying scale of the structure in the scalar field. Since this scale is unknown, information from all possible scales that can be obtained in the local window (or cube) of size R is combined.

With substitution and considering symmetric weights $\omega_{-\Delta} = \omega_\Delta$, the multi-scale operator becomes:

$$J_R f(x,y,z) = \Sigma_{\Delta=1}^{R} \omega_\Delta I_\Delta f(x,y,z) = \Sigma_{\Delta=-R}^{R} \omega_\Delta I_\Delta f_R(x,y,z) \qquad (2)$$

(Here $f_R(x,y,z)$ only contains the first part of $D_x$, $D_y$ and $D_z$),
where $\omega_\Delta$ is the weight at domain [R, −R]. Equation (2) is actually the combination of filtering in three different directions.

2D Lagrange Interpolation

In practice, discrete surface points are usually used instead of continuous functions. A polynomial formula using a 2D Lagrange interpolation is introduced to simulate a discrete surface (usually referred as the Newton Cotes Method). In this method, first, the Lagrange interpolation is used to find a smooth function to generate observed discrete data points. Then, the smooth function is numerically integrated into Equation (2).

Suppose that the observed discrete data:

$$f(x_i,y_j), i=0,1,\ldots,M; j=0,1,\ldots,M$$

is generated from an underlying smooth function $f(x,y)$.

The Lagrange interpolation is used to form an approximation function:

$$p(x,y)$$

to represent $f(x,y)$ such that:

$$p(x_i,y_j)=f(x_i,y_j), \text{ for } i=0,1,\ldots,M; j=0,1,\ldots,M.$$

The Lagrange coefficients for the points $(x_i,y_j)$ can be defined as:

$$\Phi_i^M(x) = \prod_{\substack{k=0 \\ k\neq i}}^{M} \frac{x-x_k}{x_i-x_k}, \text{ where } i=0,1,\ldots,M \text{ and} \qquad (3)$$

$$\Phi_j^M(y) = \prod_{\substack{k=0 \\ k\neq j}}^{M} \frac{y-y_k}{y_j-y_k}, \text{ where } i=0,1,\ldots,M. \qquad (4)$$

Note that Equations (3) and (4) provide two one dimensional polynomials for the two-dimensional Lagrange interpolation. Equation (3) is a M-th order polynomial for x, and Equation (4) is a M-th order polynomial for y. When these two polynomials multiplied together, that is:

$$\Phi_i^M(x)\cdot\Phi_j^M(y),$$

the polynomial for 2D Lagrange interpolation is obtained.

Equation (5) is a 2D polynomial that passes through all the given data points $(x_i,y_i)$, $i=0, 1, 2, \ldots, M$. This polynomial is used to approximate an underlying signal $f(x,y)$ that generates the data $(x_i,y_i)$, $i=0, 1, 2, \ldots, M$. The polynomial function of p(x,y) can be expressed by as:

$$p(x,y)=\Sigma_{i=1}^{M}\Sigma_{j=0}^{M} f(x_i,y_j)\cdot\Phi_i^M(x)\cdot\Phi_j^M \qquad (5).$$

If using a polynomial approximation p(x,y) with the underlying function $f(x,y)$, a 2D definite integration involving $f(x,y)$ can be approximated by integration of p(x,y). Replace $f(x,y,z)$ in Equation (2) with the p(x,y) Equation (4). The 2D integration for one direction with data range:

$$x\in(x_p,x_q), y\in(y_p,y_q)$$

can be approximated by:

$$\int_{x_p}^{x_q}\int_{y_p}^{y_q} f(x,y)dxdy = \int_{x_p}^{x_q}\int_{y_p}^{y_q} p(x,y)dxdy$$

and $$\int_{x_p}^{x_q}\int_{y_p}^{y_q}\Sigma_{j=0}^{M} f(x_i,y_j)\cdot\Phi_i^M(x)\cdot\Phi_j^M(y)dxd \qquad (6).$$

Equation (6) describes how an unknown underlying function $f(x,y)$, from which the samples $f(x_i,y_i)$ are drawn, can be approximated by a polynomial. Then the integration of this function $f(x,y)$ over a square region $[x_p,x_q]\times[y_p,y_q]$ can be approximated by integrating this polynomial. The subscripts p and q are used to denote the two limits in each integral.

Discrete Implementation of the Masks

When given data points $(x_i,y_i)$ are regularly spaced, that is, the distance between adjacent $x_i$'s are the same, then the 2D integration in Equation (6) can be calculated by Equation (7). For the discrete domain with:

$$x\in(x_p,x_q), y\in(y_p,y_q) \text{ and } i=0,1\ldots M; j=0,1\ldots M,$$

Equation (6) can be further expressed as:

$$= \sum_{i=0}^{M}\sum_{j=0}^{M} f(x_i, y_j)\left\{\int_{\bar{x}_p}^{\bar{x}_q}\int_{\bar{y}_p}^{\bar{y}_q} \frac{(-1)^{M-i}}{M!}\cdot\frac{(-1)^{M-j}}{M!}\cdot\binom{M}{i} \right. \qquad (7)$$
$$\left. \binom{M}{j}\prod_{\substack{b=0 \\ b\neq i}}^{M}\prod_{\substack{c=0 \\ c\neq j}}^{M}(\bar{x}-b)(\bar{y}-c)d\bar{x}d\bar{y}\right\},$$

where a normalized limit is defined as:

$$\bar{x}_p = \frac{x_p-x_0}{T}, \bar{x}_q = \frac{x_q-x_0}{T}, \bar{y}_p = \frac{y_p-y_0}{T}, \bar{y}_q = \frac{y_q-y_0}{T},$$

and where, T is the sampling interval, which is assumed to be 1 when no such information is available.

Figure 2:
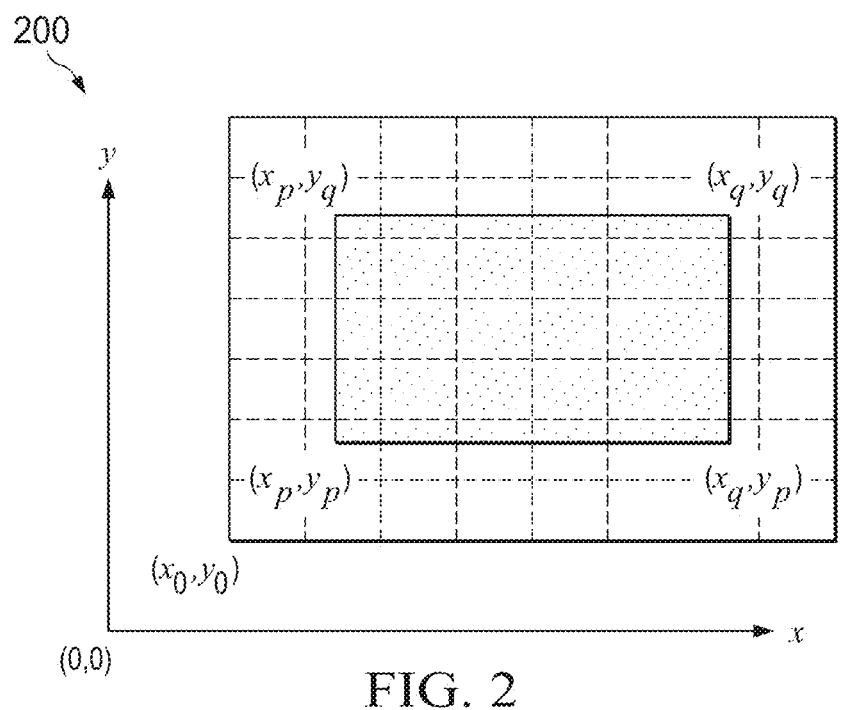
FIG. 2 is a block diagram illustrating a domain of integration range for one two-dimensional (2D) slice of a domain of integration, according to an implementation.

FIG. 2 is a block diagram 200 illustrating a domain of integration range for one 2D slice of the domain of integration (with reference to Equations (6) and (7)), according to an implementation. Note that the range in a digital sense is a window size, $6\sigma$, where $\sigma$ is the previously mentioned standard deviation.

Equation (8) describes how each coefficient in the 3D filter mask is calculated. Here the filter is of size $(M+1)\times(M+1)\times(M+1)$. The indices m, n and N are indices of this three dimensional mask.

Note that Equations (7) and Equation (8) are different. Typically, Equation (7) provides additional details for Equation (6), which is also an approximation of 2D numerical integration. Typically, Equation (8) calculates the mask for the operator in Equation (1) a Equation (2) in the original document.

The $\{\ldots\}$ above is defined as mask $g_{m,n,N}^M$, the discrete mask for 3D integration filter for each set of (m, n, N) will become:

$$g_{m,n,N}^M = \qquad (8)$$

$$\frac{(-1)^{m_-}}{m_+!m_-!}\cdot\frac{(-1)^{n_-}}{n_+!n_-!}\int_{N_-}^{N_+}\int_{N_-}^{N_+}\left(\prod_{\substack{b=0 \\ b\neq m_+}}^{M}(s-b)\right)\left(\prod_{\substack{c=0 \\ c\neq m_+}}^{M}(t-b)\right)dsdt,$$

where M is the parameter that determines the size of the mask, that is, $(M+1)\times(M+1)\times(M+1)$; m, n and N are indices of the three dimensional mask. Accordingly, $$= -\frac{M}{2}, \ldots, \frac{M}{2}, = -\frac{M}{2}, \ldots, \frac{M}{2}, \text{ and } N = -\frac{M}{2}, \ldots, \frac{M}{2}.$$

The limits of 2D integration in Equation (8) are:

$$N_+ = \frac{M}{2} + N, \text{ and } N_- = \frac{M}{2} - N.$$

For clarity of the mathematical expression, a shifted version of the subscripts can be defined as:

$$m_+ = \frac{M}{2} + m, m_- = \frac{M}{2} - m, n_+ = \frac{M}{2} + n, n_- = \frac{M}{2} - n.$$

The filter mask operator length is very flexible by varying M. A larger value of M tends to smooth harsher. Typically, M=2 and M=4 is sufficient for the orientation while mitigating any noise. The parameter M is related to the size of the local window (or cube in 3D). That is, $$M = \frac{2R}{T},$$

where T is a sampling interval. When no information about T is available, T=1 can be chosen. Given M, which is usually an even number, the size of a local window is (M+1)×(M+1)×(M+1). From the operator derived in Equation (1), we know that $D_x$, that is, the change of the scale filed $f(x,y,z)$ along the x direction, calculates integration along the y and z directions. So, when using a larger value of M, a larger window will be used in integration. From the duality between time and frequency domain, a large window in a time/spatial domain corresponds to a smaller cut-off frequency in a frequency domain. Using a larger value of M introduces more smoothing along directions that are perpendicular to the direction where the change is to be detected. This trend is similar to those in other gradient operators, such as the Sobel operator. Typically, M is chosen to be an even number, so that the mask is of odd size.

FIG. 3 illustrates a table 300 showing results of the use of a 3D filter mask coefficient of 3, according to an implementation. As previously described, the size of the filter is (M+1)×(M+1)×(M+1). Here, operator length, M, is equal to 2. The table 400 is generated using Equation (8).

Figure 4A:
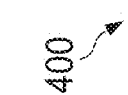

FIGS. 4A-4C illustrate a table 400 showing results of the use of a 3D filter mask coefficient of 5, according to an implementation. As previously described, the size of the filter is (M+1)×(M+1)×(M+1). Here, M=4. The table 500 is generated using Equation (8).

Processing 3D Seismic Data Work Flow with 3D Integration Filter

Figure 5A:
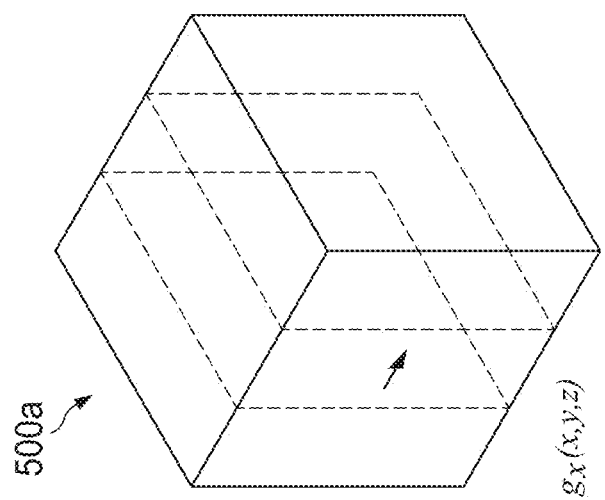
FIGS. 5A-5C are block diagrams illustrating filtering (smoothing) data in three spatial directions (x, y, and z, respectively), according to an implementation.
Figure 5B:
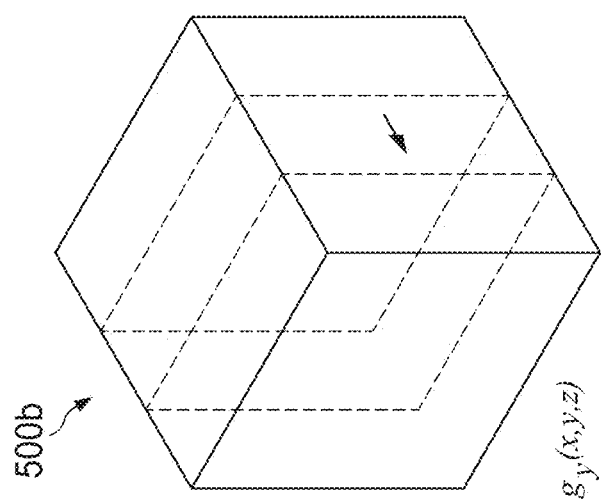
Figure 5C:
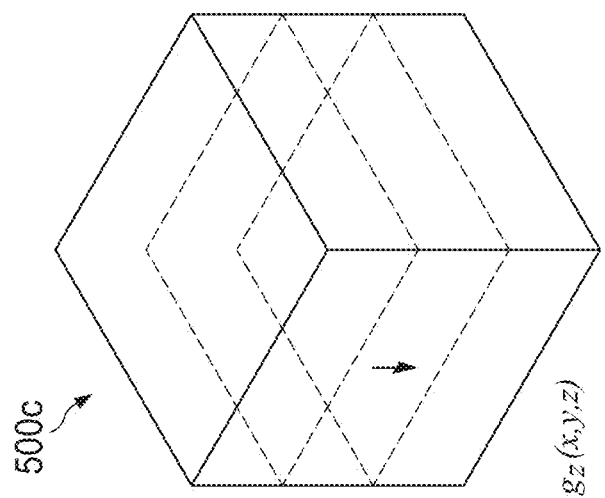

FIGS. 5A-5C are block diagrams 500a-500c illustrating filtering (smoothing) data in three spatial directions (x, y, and z, respectively), according to an implementation. In practice, the data is filtered in three dominate directions separately with a 3D filter mask for each direction and the individual results combined into a final result. The final resultant smoothing data is computed as:

$$f_{smooth}(x_i, y_i, z_i) = \qquad (9)$$
$$\sqrt{((f(x_i, y_i, z_i).*g_x(x_i, y_i, z_i))^2 + (f(x_i, y_i, z_i).*g_y(x_i, y_i, z_i))^2 + (f(x_i, y_i, z_i).*g_z(x_i, y_i, z_i))^2)/3},$$

where ".*" denotes the filtering operation described in Equation (7).

Figure 6:
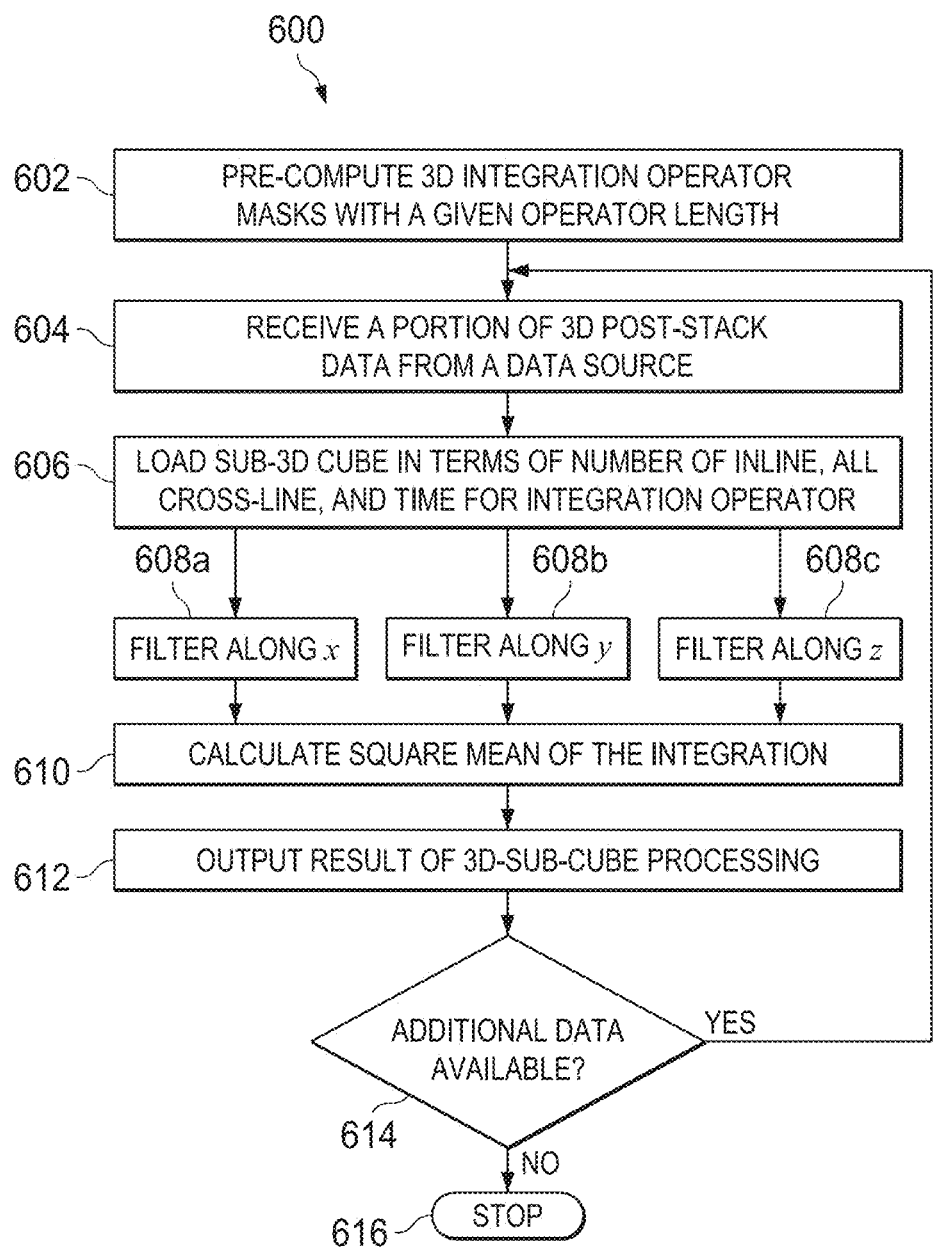
FIG. 6 is a flow chart of an example method for processing and display of 3D post-stack seismic data, according to an implementation.

FIG. 6 is a flowchart of an example method 600 for processing and display of 3D post-stack seismic data, according to an implementation. For clarity of presentation, the description that follows generally describes method 600 in the context of the other figures in this description. However, it will be understood that method 600 may be performed, for example, by any suitable system, environment, software, and hardware, or a combination of systems, environments, software, and hardware as appropriate. In some implementations, various steps of method 600 can be run in parallel, in combination, in loops, or in any order.

At 602, 3D integration filter masks are pre-computed (refer to Equation (8)) for x, y, and z dimensions with a given operator length M. For example, in typical implementations, M=2 and M=4 for operator masks of 3×3×3 and 5×5×5 (for example, as shown in FIGS. 3 and 4A-4C, respectively). From 602, method 600 proceeds to 604.

At 604, a portion of 3D post-stack data is received from a data source (inline (x), cross-line (y), and time (z)) (for example, in the Society of Exploration Geophysicists (SEG)-Y ("SEGY") or other format). From 604, method 600 proceeds to 606.

At 606, the received portion of 3D post-stack data is loaded into a generated 3D-sub-cube to the limit that system memory will allow. In typical implementations, for each 3D post stack seismic data set, multiple 3D-sub-cubes are loaded in terms of inline, cross line, and time. From 606, method 600 proceeds to 608.

If there is not enough system memory to hold the received portion of 3D post-stack data, then a 3D-sub-cube that can be held in the memory is generated and processed (the size of each 3D cube depends on available memory of the computing system). After a 3D-sub-cube is processed, the results are written to an output file. Then, if available, a next input 3D-sub-cube is read in, processed, and written to the output file. In some implementations, this processing can be similar to block-based processing in image processing.

Figure 7:
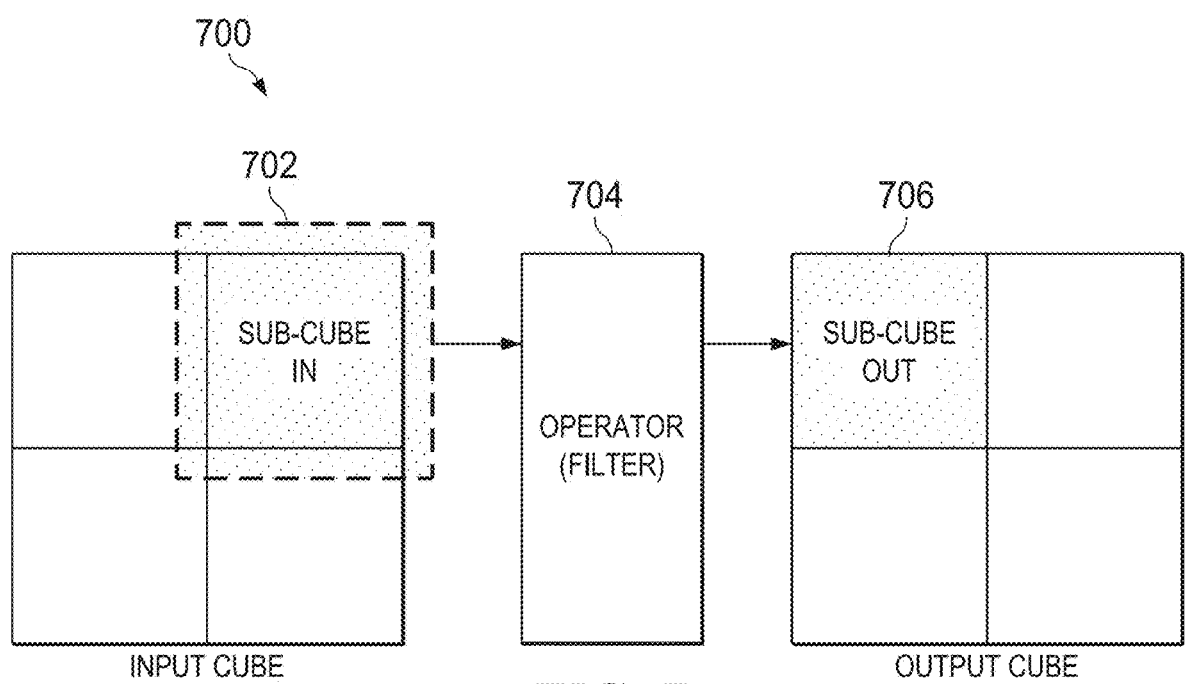
FIG. 7 is a block diagram illustrating a relationship between input 3D-sub-cube data and output sub-3D data as processed by an operator (filter) according to an implementation.

Referring to FIG. 7, FIG. 7 is a block diagram 700 illustrating a relationship between input 3D-sub-cube 702 data and output sub-3D 706 data as processed by an operator (filter) 704, according to an implementation.

The sub-cube-based processing is possible since the operators $D_x$, $D_y$, and $D_z$ (for example, operator 704) are essentially finite impulse response (FIR) filters. In signal processing, a FIR filter is a filter whose impulse response (or response to any finite length input) is of finite duration, because it settles to zero in a finite time. The output 3D-sub-cube 706 depends only on inputs (for example, input 3D-sub-cube 702), not on previous output. To obtain the output at location (m, n, N) input data in the window/cube:

$$\left[m - \frac{M}{2}, m + \frac{M}{2}\right] \times \left[n - \frac{M}{2}, n + \frac{M}{2}\right] \times \left[N - \frac{M}{2}, N + \frac{M}{2}\right] \text{ is needed.}$$

Returning to FIG. 6, at 608a-608c, 3D operators are applied to the 3D-sub-cube from three different directions (for example, refer to FIGS. 5A-5C and Equation (7) above). From 608a-608c, method 600 proceeds to 610.

At 610, the result of 608a-608c is used with Equation (9) to smooth the data in three spatial directions x, y, and z. From 610, method 600 proceeds to 612.

At 612, the resultant 3D-sub-cube is output to a data storage location (for example, in SEGY or other format). From 612, method 600 proceeds to 614.

At 614, a determination is made whether there is additional 3D post-stack data portions available to process. If YES, method 600 proceeds back to 604. If NO, method 600 stops. Here, method 600 is repeated until all input data has been processed and the final 3D cube has been output into the data storage location. Note that multiple 3D-sub-cubes are output to generate one single 3D-cube using an appending property (for example, refer to FIG. 7).

In some implementations, the SEGY format is used for input or output data, the trace header can contain geometry information, such as inline, cross line number, sample rate, and depth/time of the data recorded. As trace data is the target data used for smoothing, 3D data can be stored in SEGY format trace by trace and geometry retrieved from trace header to be processed. The described methodology is not limited to SEGY formatted data, in fact any format of 3D seismic data can be used to pass through the described 3D filtering to obtain described result.

FIGS. 8A-8C illustrate data plots 800a-800c, respectively, demonstrating advantages of the described 3D integration filter (orientation) versus a 3D Sobel filter, according to an implementation. For data applicable for a first seismic survey, dimensions x, y, z, corresponds to in-line (x), cross line (y), and time (z), respectively. The first field survey size is: 601 (inline)×951 (crossline)×463 (time); the second survey size is 620 (inline)×560 (cross line)×300 (time). FIGS. 8A-8C are a comparison between a 3D integration filter and a 3D gradient filter (Sobel) for both seismic amplitude and edge detection. The same inline or time slice result is used for both 2D and 3D cases for comparison. For example, FIG. 8A illustrates raw seismic session data, FIG. 8B illustrates edges after applying a 3D gradient filter. (Sobel), and FIG. 8C illustrates edge orientation after application of the above-described 3D integration filter. It is clear that indications 802 (oval), 804 (rectangle), and arrow (806) are clearer in FIG. 8C than in FIGS. 8A and 8B.

Figure 9B:
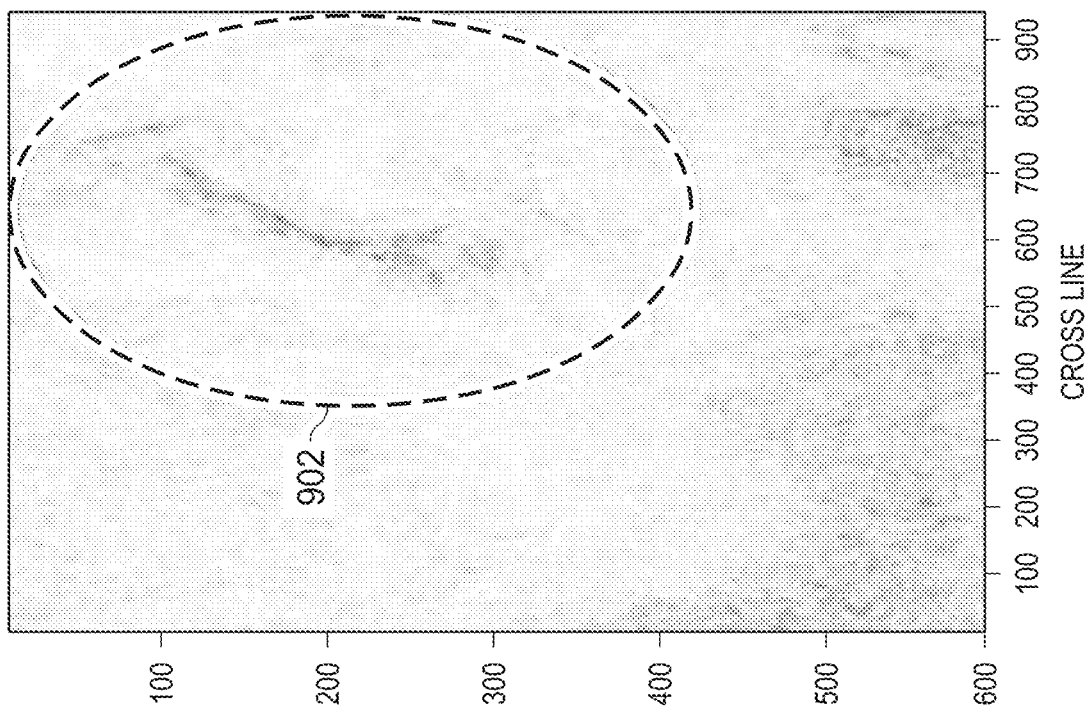
FIGS. 9A-9C illustrate data plots demonstrating advantages of the described 3D integration filter (orientation) in relation to a 2D integration filter (orientation), according to an implementation.
Figure 9A:
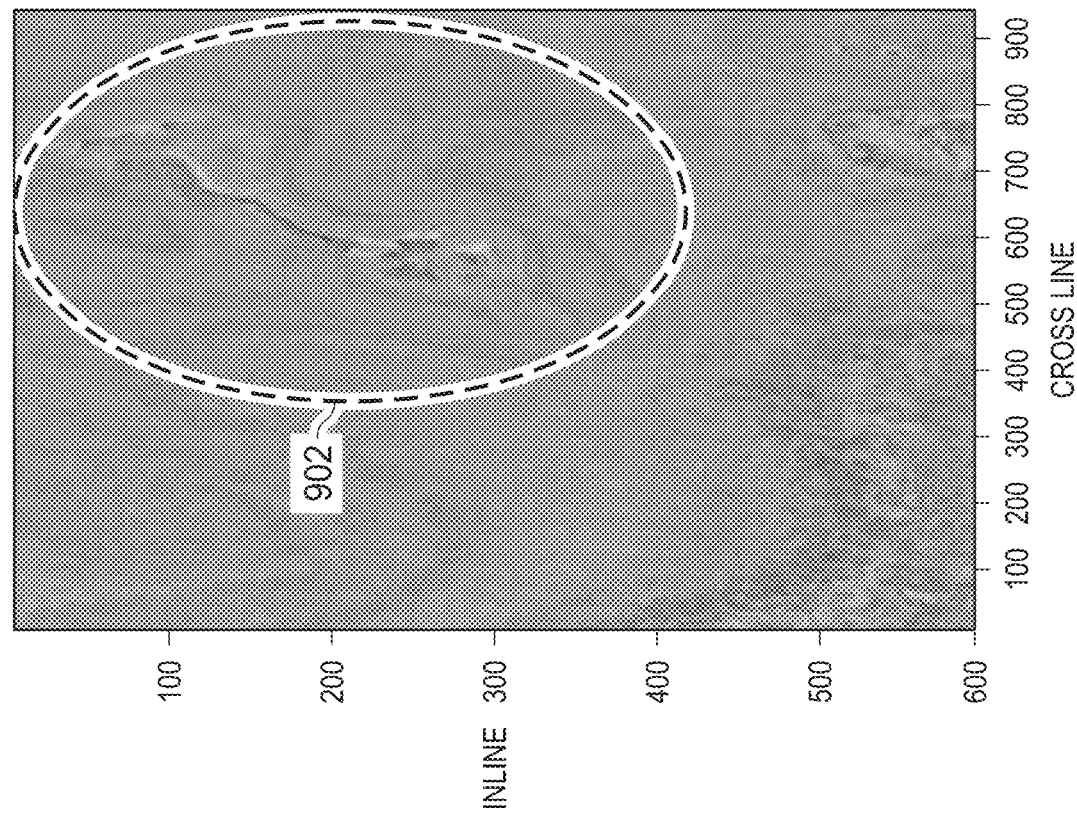
Figure 9C:
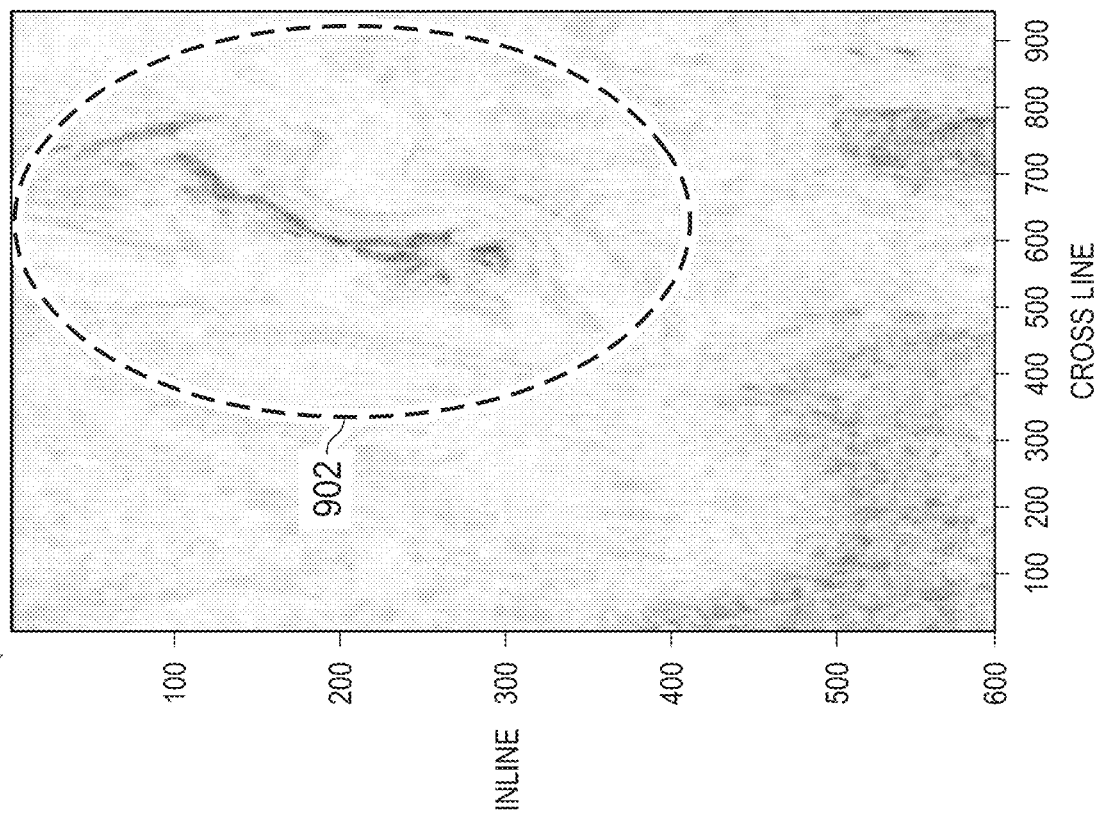

FIGS. 9A-9C illustrate data plots 900a-900c, respectively, demonstrating advantages of the described 3D integration filter (orientation) in relation to a 2D integration filter (orientation), according to an implementation. For data applicable for a second seismic survey, dimensions x, y, z, corresponds to cross-line (x), in-line (y), and time (z), respectively. The second field survey size is: 620 (inline)×560 (cross line)×300 (time). FIGS. 9A-9C are a comparison of advantages of a 3D integration filter over a 2D integration filter. The same inline or time slice result is used for both 2D and 3D cases for comparison. For example, FIG. 9A illustrates raw seismic image data, FIG. 9B illustrates edges after application of a 2D integration filter, and FIG. 9C illustrates edge orientation after application of the above-described 3D integration filter. It is clear that indication 902 (oval) is clearer in FIG. 9C than in FIGS. 9A and 9B. Only a portion of a 3D section is displayed for comparison, although the entire 3D volume is processed.

Figure 10A:
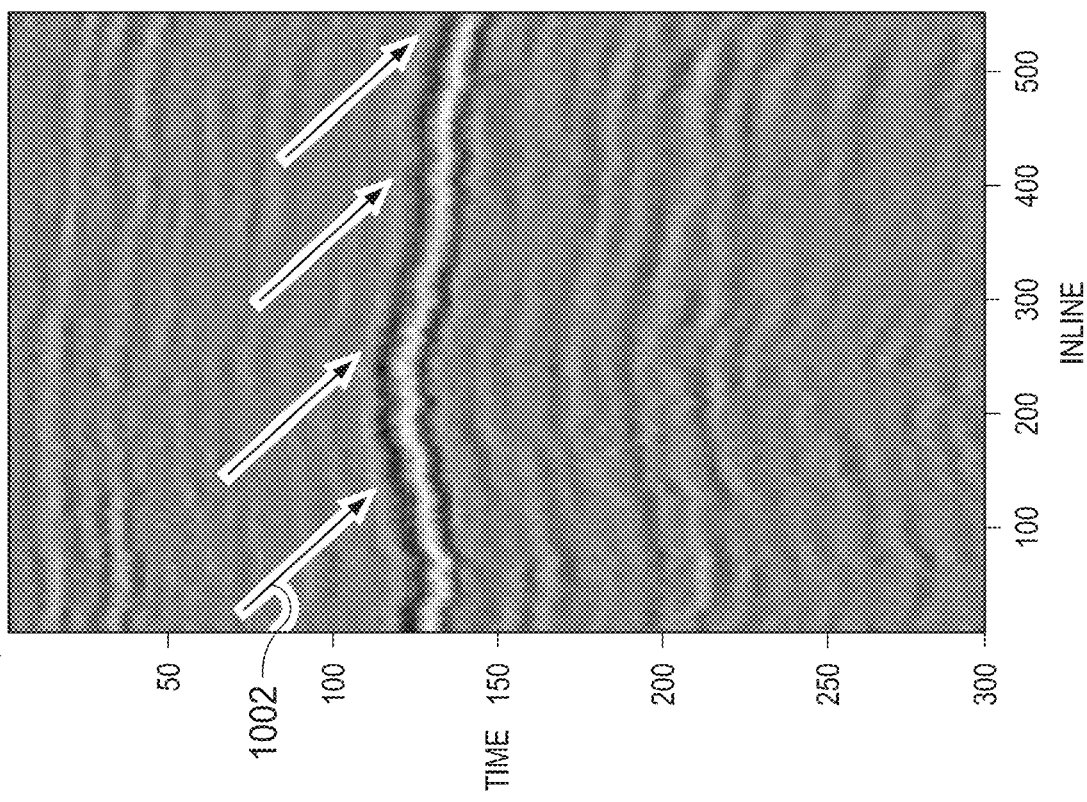

FIGS. 10A-10C illustrate data plots 1000a-1000c, respectively, demonstrating advantages of the described 3D integration filter (orientation) in relation to a 2D integration filter (orientation), according to an implementation. For data applicable for a first seismic survey, dimensions x, y, z, corresponds to in-line (x), cross line (y), and time (z), respectively. For example, FIG. 10A illustrates raw seismic amplitude (input) data, FIG. 10B illustrates edges after application of a 2D integration filter, and FIG. 10C illustrates edge orientation after application of the above-described 3D integration filter. It is clear that indications 1002 (arrows) are clearer in FIG. 10C than in FIGS. 10A and 10B. Only a portion of a 3D section is displayed for comparison, although the entire 3D volume is processed.

Figure 11:
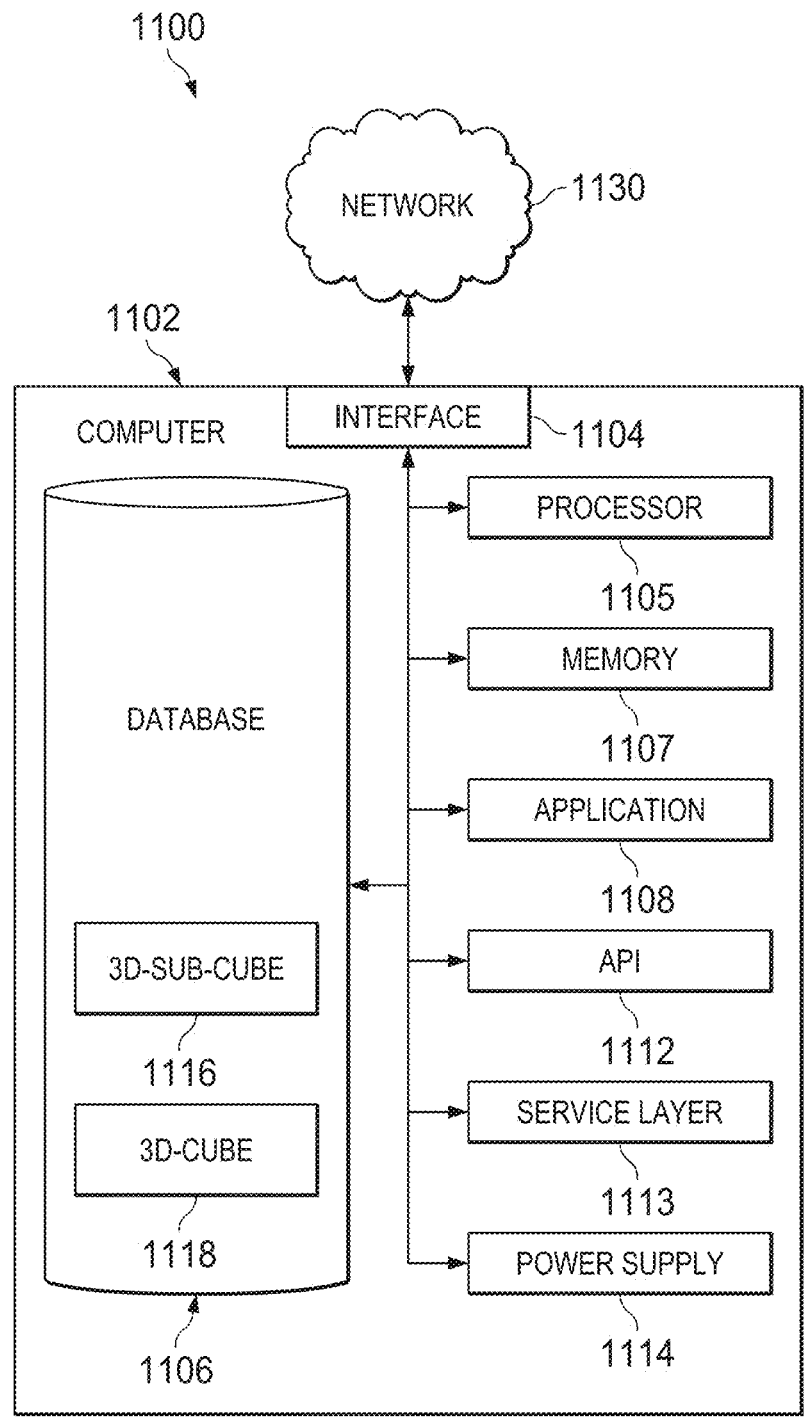
FIG. 11 is a block diagram of an exemplary computer system used to provide computational functionalities associated with described algorithms, methods, functions, processes, flows, and procedures as described in the instant disclosure, according to an implementation.

FIG. 11 is a block diagram of an example computer system 1100 used to provide computational functionalities associated with described algorithms, methods, functions, processes, flows, and procedures, as described in the instant disclosure, according to an implementation. The illustrated computer 1102 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1102 may comprise a computer that includes an input device, such as a keypad, keyboard, touch screen, or other device that can accept user information, and an output device that conveys information associated with the operation of the computer 1102, including digital data, visual, or audio information (or a combination of information), or a graphical user interface (GUI).

The computer 1102 can serve in a role as a client, network component, a server, a database or other persistency, or any other component (or a combination of roles) of a computer system for performing the subject matter described in the instant disclosure. The illustrated computer 1102 is communicably coupled with a network 1130. In some implementations, one or more components of the computer 1102 may be configured to operate within environments, including cloud-computing-based, local, global, or other environment (or a combination of environments).

At a high level, the computer 1102 is an electronic computing device operable to receive, transmit, process, store, or manage data and information associated with the described subject matter. According to some implementations, the computer 1102 may also include or be communicably coupled with an application server, e-mail server, web server, caching server, streaming data server, or other server (or a combination of servers).

The computer 1102 can receive requests over network 1130 from a client application (for example, executing on another computer 1102) and respond to the received requests by processing the received requests using an appropriate software application(s). In addition, requests may also be sent to the computer 1102 from internal users (for example, from a command console or by other appropriate access method), external or third-parties, other automated applications, as well as any other appropriate entities, individuals, systems, or computers.

Each of the components of the computer 1102 can communicate using a system bus 1103. In some implementations, any or all of the components of the computer 1102, hardware or software (or a combination of both hardware and software), may interface with each other or the interface 1104 (or a combination of both), over the system bus 1103 using an application programming interface (API) 1112 or a service layer 1113 (or a combination of the API 1112 and service layer 1113). The API 1112 may include specifications for routines, data structures, and object classes. The API 1112 may be either computer-language independent or dependent and refer to a complete interface, a single function, or even a set of APIs. The service layer 1113 provides software services to the computer 1102 or other components (whether or not illustrated) that are communicably coupled to the computer 1102. The functionality of the computer 1102 may be accessible for all service consumers using this service layer. Software services, such as those provided by the service layer 1113, provide reusable, defined functionalities through a defined interface. For example, the interface may be software written in JAVA, C++, or other suitable language providing data in extensible markup language (XML) format or other suitable format. While illustrated as an integrated component of the computer 1102, alternative implementations may illustrate the API 1112 or the service layer 1113 as stand-alone components in relation to other components of the computer 1102 or other components (whether or not illustrated) that are communicably coupled to the computer 1102. Moreover, any or all parts of the API 1112 or the service layer 1113 may be implemented as child or sub-modules of another software module, enterprise application, or hardware module without departing from the scope of this disclosure.

The computer 1102 includes an interface 1104. Although illustrated as a single interface 1104 in FIG. 11, two or more interfaces 1104 may be used according to particular needs, desires, or particular implementations of the computer 1102. The interface 1104 is used by the computer 1102 for communicating with other systems that are connected to the network 1130 (whether illustrated or not) in a distributed environment. Generally, the interface 1104 comprises logic encoded in software or hardware (or a combination of software and hardware) and is operable to communicate with the network 1130. More specifically, the interface 1104 may comprise software supporting one or more communication protocols associated with communications such that the network 1130 or interface's hardware is operable to communicate physical signals within and outside of the illustrated computer 1102.

The computer 1102 includes a processor 1105. Although illustrated as a single processor 1105 in FIG. 11, two or more processors may be used according to particular needs, desires, or particular implementations of the computer 1102. Generally, the processor 1105 executes instructions and manipulates data to perform the operations of the computer 1102 and any algorithms, methods, functions, processes, flows, and procedures as described in the instant disclosure.

The computer 1102 also includes a database 1106 that can hold data for the computer 1102 or other components (or a combination of both) that can be connected to the network 1130 (whether illustrated or not). For example, database 1106 can be an in-memory, conventional, or other type of database storing data consistent with this disclosure. In some implementations, database 1106 can be a combination of two or more different database types (for example, a hybrid in-memory and conventional database) according to particular needs, desires, or particular implementations of the computer 1102 and the described functionality. Although illustrated as a single database 1106 in FIG. 11, two or more databases (of the same or combination of types) can be used according to particular needs, desires, or particular implementations of the computer 1102 and the described functionality. While database 1106 is illustrated as an integral component of the computer 1102, in alternative implementations, database 1106 can be external to the computer 1102. As illustrated, the database 1106 can be configured to hold one or more 3D-sub-cubes 1116 and 3D-cubes 1118.

The computer 1102 also includes a memory 1107 that can hold data for the computer 1102 or other components (or a combination of both) that can be connected to the network 1130 (whether illustrated or not). For example, memory 1107 can be random access memory (RAM), read-only memory (ROM), optical, magnetic, and the like, storing data consistent with this disclosure. In some implementations, memory 1107 can be a combination of two or more different types of memory (for example, a combination of RAM and magnetic storage) according to particular needs, desires, or particular implementations of the computer 1102 and the described functionality. Although illustrated as a single memory 1107 in FIG. 11, two or more memories 1107 (of the same or combination of types) can be used according to particular needs, desires, or particular implementations of the computer 1102 and the described functionality. While memory 1107 is illustrated as an integral component of the computer 1102, in alternative implementations, memory 1107 can be external to the computer 1102.

The application 1108 is an algorithmic software engine providing functionality according to particular needs, desires, or particular implementations of the computer 1102, particularly with respect to functionality described in this disclosure. For example, application 1108 can serve as one or more components, modules, or applications. Further, although illustrated as a single application 1108, the application 1108 may be implemented as multiple applications 1108 on the computer 1102. In addition, although illustrated as integral to the computer 1102, in alternative implementations, the application 1108 can be external to the computer 1102.

The computer 1102 can also include a power supply 1114. The power supply 1114 can include a rechargeable or non-rechargeable battery that can be configured to be either user- or non-user-replaceable. In some implementations, the power supply 1114 can include power-conversion or management circuits (including recharging, standby, or other power management functionality). In some implementations, the power-supply 1114 can include a power plug to allow the computer 1102 to be plugged into a wall socket or other power source to, for example, power the computer 1102 or recharge a rechargeable battery.

There may be any number of computers 1102 associated with, or external to, a computer system containing computer 1102, each computer 1102 communicating over network 1130. Further, the term "client," "user," and other appropriate terminology may be used interchangeably, as appropriate, without departing from the scope of this disclosure. Moreover, this disclosure contemplates that many users may use one computer 1102, or that one user may use multiple computers 1102.

Described implementations of the subject matter can include one or more features, alone or in combination.

For example, in a first implementation, a computer-implemented method, comprising: precomputing a separate three-dimensional (3D) integration filter mask for each of x, y, and z dimensions with a given operator length; receiving a portion of a 3D post-stack seismic data set for processing; loading the received portion of 3D post-stack seismic data set into a generated 3D-sub-cube; applying the separate 3D integration filter masks to the loaded 3D-sub-cube to generate filtered 3D-sub-cube data; and calculating the square mean of the 3D-sub-cube to generate smoothed 3D-sub-cube data.

The foregoing and other described implementations can each, optionally, include one or more of the following features:

A first feature, combinable with any of the following features, wherein $$M = \frac{2R}{T},$$

is a sampling interval, R is a dimensional value of a measurement of the side of a square or cube, the operator length is M+1, and the size of a local window is (M+1)×(M+1)×(M+1).

A second feature, combinable with any of the previous or following features, wherein the value of M is selected to be of an even value so that the 3D integration filter masks are of an odd-valued size.

A third feature, combinable with any of the previous or following features, wherein the generated 3D-sub-cube is configured to a size to the limit that that system memory of a computer processing system will allow and, with respect to the 3D post-stack seismic data set, loaded in terms of inline, cross line, and time.

A fourth feature, combinable with any of the previous or following features, wherein an appropriate precomputed 3D integration filter mask is applied separately to the loaded 3D-sub-cube for each particular dimension of the x, y, and z dimensions.

A fifth feature, combinable with any of the previous or following features, comprising determining whether there are additional 3D-sub-cubes of the 3D post-stack seismic data set to process.

A sixth feature, combinable with any of the previous or following features, comprising combining the smoothed 3D-sub-cube-data associated with each portion of the 3D post-stack seismic data set into a smoothed 3D-cube using an appending property.

In a second implementation, a non-transitory, computer-readable medium storing one or more instructions executable by a computer system to perform operations comprising: precomputing a separate three-dimensional (3D) integration filter mask for each of x, y, and z dimensions with a given operator length; receiving a portion of a 3D post-stack seismic data set for processing; loading the received portion of 3D post-stack seismic data set into a generated 3D-sub-cube; applying the separate 3D integration filter masks to the loaded 3D-sub-cube to generate filtered 3D-sub-cube data; and calculating the square mean of the 3D-sub-cube to generate smoothed 3D-sub-cube data.

The foregoing and other described implementations can each, optionally, include one or more of the following features:

A first feature, combinable with any of the following features, wherein $$M = \frac{2R}{T},$$

T is a sampling interval, R is a dimensional value of a measurement of the side of a square or cube, the operator length is M+1, and the size of a local window is (M+1)×(M+1)×(M+1).

A second feature, combinable with any of the previous or following features, wherein the value of M is selected to be of an even value so that the 3D integration filter masks are of an odd-valued size.

A third feature, combinable with any of the previous or following features, wherein the generated 3D-sub-cube is configured to a size to the limit that that system memory of a computer processing system will allow and, with respect to the 3D post-stack seismic data set, loaded in terms of inline, cross line, and time.

A fourth feature, combinable with any of the previous or following features, wherein an appropriate precomputed 3D integration filter mask is applied separately to the loaded 3D-sub-cube for each particular dimension of the x, y, and z dimensions.

A fifth feature, combinable with any of the previous or following features, comprising one or more instructions to determine whether there are additional 3D-sub-cubes of the 3D post-stack seismic data set to process.

A sixth feature, combinable with any of the previous or following features, comprising one or more instructions to combine the smoothed 3D-sub-cube-data associated with each portion of the 3D post-stack seismic data set into a smoothed 3D-cube using an appending property.

In a third implementation, a computer-implemented system, comprising: a computer memory; and a hardware processor interoperably coupled with the computer memory and configured to perform operations comprising: precomputing a separate three-dimensional (3D) integration filter mask for each of x, y, and z dimensions with a given operator length; receiving a portion of a 3D post-stack seismic data set for processing; loading the received portion of 3D post-stack seismic data set into a generated 3D-sub-cube; applying the separate 3D integration filter masks to the loaded 3D-sub-cube to generate filtered 3D-sub-cube data; and calculating the square mean of the 3D-sub-cube to generate smoothed 3D-sub-cube data.

The foregoing and other described implementations can each, optionally, include one or more of the following features:

A first feature, combinable with any of the following features, wherein $$M = \frac{2R}{T},$$

T is a sampling interval, R is a dimensional value of a measurement of the side of a square or cube, the operator length is M+1, and the size of a local window is (M+1)×(M+1)×(M+1).

A second feature, combinable with any of the previous or following features, wherein the value of M is selected to be of an even value so that the 3D integration filter masks are of an odd-valued size.

A third feature, combinable with any of the previous or following features, wherein the generated 3D-sub-cube is configured to a size to the limit that that system memory of a computer processing system will allow and, with respect to the 3D post-stack seismic data set, loaded in terms of inline, cross line, and time.

A fourth feature, combinable with any of the previous or following features, wherein an appropriate precomputed 3D integration filter mask is applied separately to the loaded 3D-sub-cube for each particular dimension of the x, y, and z dimensions.

A fifth feature, combinable with any of the previous or following features, further configured to determine whether there are additional 3D-sub-cubes of the 3D post-stack seismic data set to process.

A sixth feature, combinable with any of the previous or following features, further configured to combine the smoothed 3D-sub-cube-data associated with each portion of the 3D post-stack seismic data set into a smoothed 3D-cube using an appending property.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising: precomputing a separate three-dimensional (3D) integration filter mask for each of x, y, and z dimensions with a given operator length; receiving a portion of a 3D post-stack seismic data set for processing; loading the received portion of 3D post-stack seismic data set into a generated 3D-sub-cube;
   applying the separate 3D integration filter masks to the loaded 3D-sub-cube to generate filtered 3D-sub-cube data;
   calculating a root mean square of the filtered 3D-sub-cube data to generate smoothed 3D-sub-cube data; and
   generating and displaying, based on the smoothed 3D-sub-cube data, a subsurface image that includes an image of at least one of faults, fractures, and channels in the subsurface.

2. The computer-implemented method of claim 1, wherein $$M = \frac{2R}{T},$$

T is a sampling interval of the 3D post-stack seismic data, R is a dimensional value of a measurement of the side of a square or cube that represents the portion of the 3D post-stack seismic data, the operator length is M+1, and the size of the square or cube is (M+1)×(M+1)×(M+1).

3. The computer-implemented method of claim 2, wherein the value of M is selected to be of an even value so that the 3D integration filter masks are of an odd-valued size.

4. The computer-implemented method of claim 1, wherein the generated 3D-sub-cube is configured to a size to the limit that that system memory of a computer processing system will allow and, with respect to the 3D post-stack seismic data set, loaded in terms of inline, cross line, and time.

5. The computer-implemented method of claim 1, wherein an appropriate precomputed 3D integration filter mask is applied separately to the loaded 3D-sub-cube for each particular dimension of the x, y, and z dimensions.

6. The computer-implemented method of claim 1, comprising determining whether there are additional 3D-sub-cubes of the 3D post-stack seismic data set to process.

7. The computer-implemented method of claim 1, comprising combining the smoothed 3D-sub-cube-data associated with each portion of the 3D post-stack seismic data set into a smoothed 3D-cube using an appending property.

8. A non-transitory, computer-readable medium storing one or more instructions executable by a computer system to perform operations comprising:
   precomputing a separate three-dimensional (3D) integration filter mask for each of x, y, and z dimensions with a given operator length;
   receiving a portion of a 3D post-stack seismic data set for processing;
   loading the received portion of 3D post-stack seismic data set into a generated 3D-sub-cube;
   calculating a root mean square of the filtered 3D-sub-cube data to generate smoothed 3D-sub-cube data; and
   generating and displaying, based on the smoothed 3D-sub-cube data, a subsurface image that includes an image of at least one of faults, fractures, and channels in the subsurface.

9. The non-transitory, computer-readable medium of claim 8, wherein $$M = \frac{2R}{T},$$

T is a sampling interval of the 3D post-stack seismic data, R is a dimensional value of a measurement of the side of a square or cube that represents the portion of the 3D post-stack seismic data, the operator length is (M+1)×(M+1)×(M+1).

10. The non-transitory, computer-readable medium of claim 9, wherein the value of M is selected to be of an even value so that the 3D integration filter masks are of an odd-valued size.

11. The non-transitory, computer-readable medium of claim 8, wherein the generated 3D-sub-cube is configured to a size to the limit that that system memory of a computer processing system will allow and, with respect to the 3D post-stack seismic data set, loaded in terms of inline, cross line, and time.

12. The non-transitory, computer-readable medium of claim 8, wherein an appropriate precomputed 3D integration filter mask is applied separately to the loaded 3D-sub-cube for each particular dimension of the x, y, and z dimensions.

13. The non-transitory, computer-readable medium of claim 8, comprising one or more instructions to determine whether there are additional 3D-sub-cubes of the 3D post-stack seismic data set to process.

14. The non-transitory, computer-readable medium of claim 8, comprising one or more instructions to combine the smoothed 3D-sub-cube-data associated with each portion of the 3D post-stack seismic data set into a smoothed 3D-cube using an appending property.

15. A computer-implemented system, comprising:
   a computer memory; and
   a hardware processor interoperably coupled with the computer memory and configured to perform operations comprising:
      precomputing a separate three-dimensional (3D) integration filter mask for each of x, y, and z dimensions with a given operator length;
      receiving a portion of a 3D post-stack seismic data set for processing;
      loading the received portion of 3D post-stack seismic data set into a generated 3D-sub-cube;
      calculating a root mean square of the filtered 3D-sub-cube data to generate smoothed 3D-sub-cube data; and
      generating and displaying, based on the smoothed 3D-sub-cube data, a subsurface image that includes an image of at least one of faults, fractures, and channels in the subsurface.

16. The computer-implemented system of claim 15, wherein $$M = \frac{2R}{T},$$

T is a sampling interval of the 3D post-stack seismic data, R is a dimensional value of a measurement of the side of a square or cube that represents the portion of the 3D post-stack seismic data, the operator length is M+1, and the size of the square or cube is (M+1)×(M+1)×(M+1), and wherein the value of M is selected to be of an even value so that the 3D integration filter masks are of an odd-valued size.

17. The computer-implemented system of claim 15, wherein the generated 3D-sub-cube is configured to a size to the limit that that system memory of a computer processing system will allow and, with respect to the 3D post-stack seismic data set, loaded in terms of inline, cross line, and time.

18. The computer-implemented system of claim 15, wherein an appropriate precomputed 3D integration filter mask is applied separately to the loaded 3D-sub-cube for each particular dimension of the x, y, and z dimensions.

19. The computer-implemented system of claim 15, further configured to determine whether there are additional 3D-sub-cubes of the 3D post-stack seismic data set to process.

20. The computer-implemented system of claim 15, further configured to combine the smoothed 3D-sub-cube-data associated with each portion of the 3D post-stack seismic data set into a smoothed 3D-cube using an appending property.

* * * * *

UNITED STATES PATENT AND TRADEMARK OFFICE
CERTIFICATE OF CORRECTION

PATENT NO. : 10,783,693 B2  Page 1 of 1
APPLICATION NO. : 15/584907
DATED : September 22, 2020
INVENTOR(S) : Saleh Al-Dossary and Jinsong Wang It is certified that error appears in the above-identified patent and that said Letters Patent is hereby corrected as shown below:

In the Claims

In Column 19, Line 37, Claim 4, please replace "that that" with -- that --

In Column 20, Line 20, Claim 11, please replace "that that" with -- that --

In Column 21, Line 5, Claim 17, please replace "that that" with -- that --

In Column 19, Line 49, Claim 7, please replace "3D-sub-cube-data" with -- 3D-sub-cube data --

In Column 20, Line 34, Claim 14, please replace "3D-sub-cube-data" with -- 3D-sub-cube data --

In Column 21, Line 18, Claim 20, please replace "3D-sub-cube-data" with -- 3D-sub-cube data --

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*